Sept. 11, 1956          J. STERN          2,762,566

CODE MATCHING SYSTEMS

Filed April 25, 1952          3 Sheets-Sheet 1

INVENTOR
JOSHUA STERN
BY Howard L. Rose
AGENT

Sept. 11, 1956 J. STERN 2,762,566
CODE MATCHING SYSTEMS
Filed April 25, 1952 3 Sheets-Sheet 2

INVENTOR
JOSHUA STERN
BY Howard L. Rose
AGENT

Sept. 11, 1956 J. STERN 2,762,566
CODE MATCHING SYSTEMS
Filed April 25, 1952 3 Sheets-Sheet 3

INVENTOR
JOSHUA STERN

BY Howard L. Rose

AGENT

United States Patent Office 2,762,566
Patented Sept. 11, 1956

2,762,566

CODE MATCHING SYSTEMS

Joshua Stern, Silver Spring, Md.

Application April 25, 1952, Serial No. 284,485

11 Claims. (Cl. 235—61.7)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

The present invention relates to optical means for searching for a particular code which has been recorded on tape, cards, or films in the form of perforated or transparent locations, each location representing a digit or a letter and the entire set representing a coded designation. It is often desirable in statistical or calculating machines to be able to quickly and accurately locate information which falls in a certain category or categories. These coding systems are also employed in machines which are used to locate certain documents, or books, or information pertaining to a particular science or subclass of that science. There are available today a number of systems for accomplishing these results. Perhaps one of the most common methods employs mechanical elements which complete an electrical circuit when the elements are allowed to contact each other through perforations in a card or tape. The disadvantages of this type of system lie in the fact that it is inherently slow and that it is necessary to change the circuit connections between the elements every time the field of search is changed. A number of optical means have been proposed, but these also have certain inherent limitations. In one system it is necessary to have a photocell for each possible location of a coded digit, and here again it is necessary to re-wire the photocells before each change in the field of search. In another optical system, which is in current use, a single photocell may be used, in which case the system is responsive to a complete absence of light impinging upon the cell. However, in this system disadvantages arise from the fact that only certain code combinations can be utilized, and this limits the number of separate pieces of information that may be stored and also limits the number of pieces of information which may be stored in any particular category. An example of this type of system may be found in the Goldberg Patent No. 1,838,389. In this system a transparent film carries a given code designation which appears as opaque markings on the film. Light is passed through the film and is projected onto an opaque mask which has upon it transparent code locations, which indicate the particular class of information being searched for. A photocell is located behind the mask and when light impinges upon the photocell the system is held in an unactuated condition. If a perfect match is obtained between the film and the mask, no light will pass through the film at the particular point at which the mask is transparent; that is, light will strike the mask where it is opaque and no light will strike it where it is transparent. As a result no light will reach the photocell and the system will be actuated. The difficulty in this system arises in the following manner. Say for example that a particular classification is designated by the letters GE. No light will pass through the film at the points at which the G and E appear. If a G and E appear at the same position on the mask no light will reach the photocell. However, if a mask were used which contained the code GF, again no light would reach the photocell, since the E would allow no light to reach the mask at the position where the F is located. Therefore in a given system the code indications GE and GF could not both be used. This greatly reduces the number of code classifications that can be used in any given system. This same difficulty arises regardless of whether numbers, letters, binary, or decimal codes are used.

It is an object of this invention to employ a system of code matching which makes it possible to use all possible code positions in any given system without the necessity for rewiring the system before each change in the filed of search.

Another object of this invention is to provide a system in which a single photocell may be used for detecting a match or mismatch between the record and the mask.

Another object of the invention is to provide means for selecting information in particular classes by means of the use of two sets of beams of light directed through the film and mask from opposite directions.

Another object of the invention is to provide a very rapid and accurate optical selection system which permits the use of all possible code combinations in a particular code system.

Other objects and advantages of the invention will become apparent upon reference to the specification and drawings.

Figure 1:
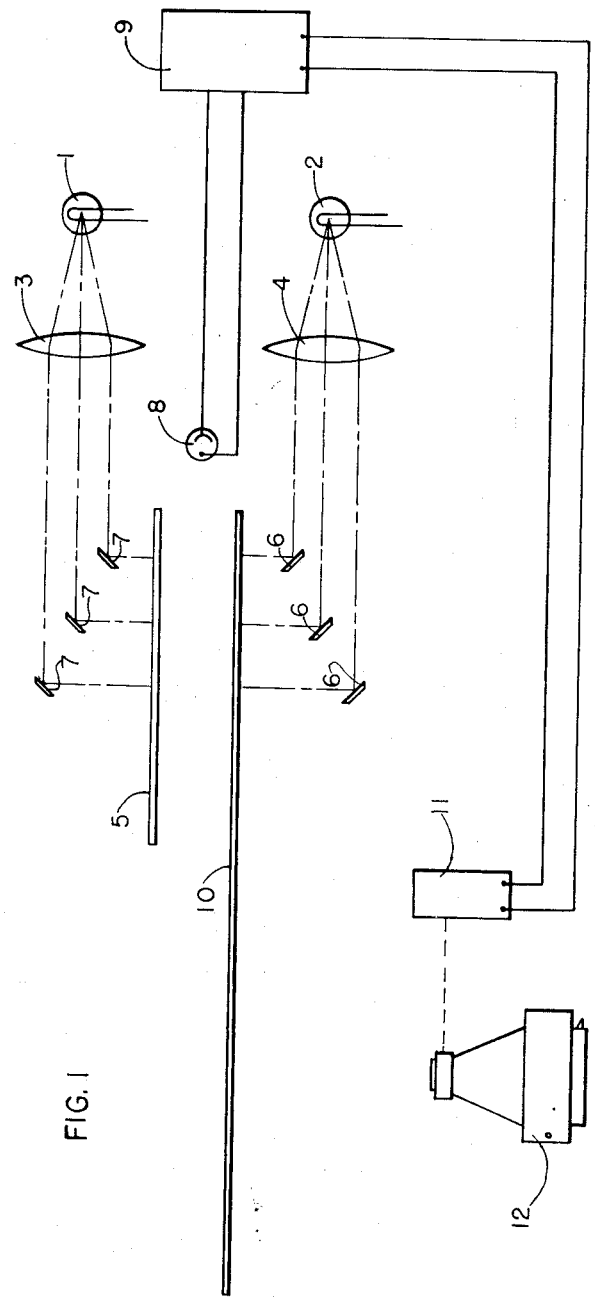
Figure 1 is a diagrammatic drawing of the control mechanism of the system.
Figure 2:
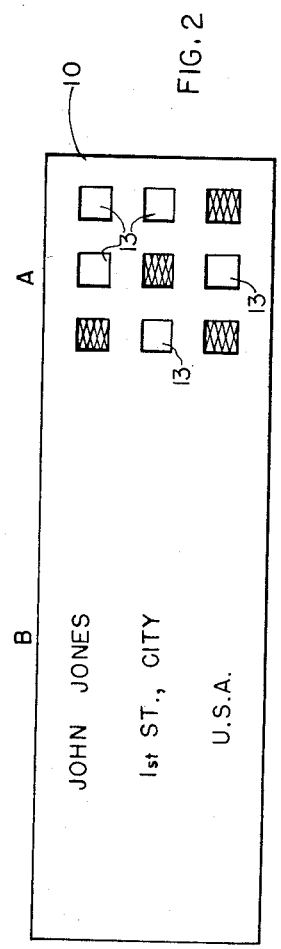
Figure 2 shows a card which may be used in this system.

Referring to Figure 1, 1 and 2 are sources of light, which are placed at the focal points of the lenses 3 and 4 respectively. The light, which is formed into parallel rays by the lenses, falls on the mirrors 6 and 7, the mirrors in each group being parallel to the other mirrors in that group and in a plane which is at an inclination of 45 degrees to the plane of the mask 5 and the record element 10, respectively. Each set of mirrors must have a mirror for each possible code location so that light will be available at that point. The light striking the mirrors is deflected through a 90 degree angle and onto the face of the mask 5 and record element 10. The mask carries the code designation of the information that is to be located, while the record element carries the code designation at A of the information carried on the rest of the record element at B. The mirrors are smaller than the holes in the card thereby insuring that when the mirrors are properly positioned all the light will pass through the hole and none of it will strike the edges of the card around the hole. The necessity for this will become apparent later in the discussion. Photoelectric cell 8 monitors the space between the record element and mask, and the output of the photocell feeds amplifier 9. The output of the amplifier controls the relay 11, which in turn operates the shutter of the camera 12 causing it to take a picture when complete coincidence is obtained between the record element and mask. In the alternative the output of the amplifier may be used to operate a counter or any other control mechanism. The record element, which may take the form of cards, tape, or film, may be brought into position under the mask by any one of a number of different methods now in current use. This very simple apparatus is used primarily to demonstrate the method of operation of the present optical system, and the invention is by no means limited to this system. A more sophisticated apparatus may be employed if desired.

The record element used may take the form of the card shown in Figure 2 in which the section A contains the code designations in the form of rectangular or circular holes 13 for the information carried on the card at position B. The holes in the cards and masks should be as small as possible so as to reduce the area required for the coding. Since, as the holes get smaller, less light will be available for reflection from the inner surfaces of the mask and card to the photocell these surfaces should be covered with a highly reflecting material thereby making the most efficient use of the available light. The invention is not limited to the use of opaque cards with punched holes, as is shown in this figure, but may be used with continuous tapes which are perforated as shown in Figures 3 to 5, or opaque strips of film which have transparent positions for the coded information.

The operation of this device will be explained with reference to Figures 3–5. A set of light probes consisting of well-defined and collimated beams of light proceeds downward from the mirrors 6 shown in Figure 1 and another similar set of beams proceeds upward from the mirrors 7. The light proceeding upward is blocked by the card at all locations except those at which there are perforations in the card. Since there is a corresponding perforation in the mask for all of the perforations in the card, all of the light passing through the card will also pass through the mask and no light will be reflected from the bottom surface of the mask. However, since the mask contains one more perforation than the card, light will be reflected from the top surface of the card at a location corresponding to the extra perforation in the mask. The light thus reflected from the top surface of the card will impinge upon the photocell and the system will be maintained in unactuated position indicating a mismatch.

Figure 3:
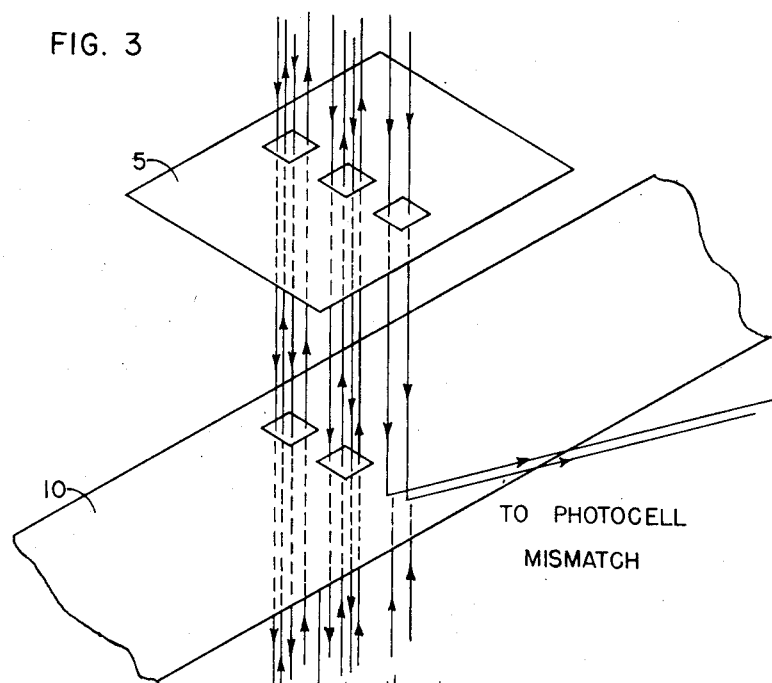
Figure 3–5 are diagrammatic illustrations of the optical principle upon which the system operates.
Figure 4:
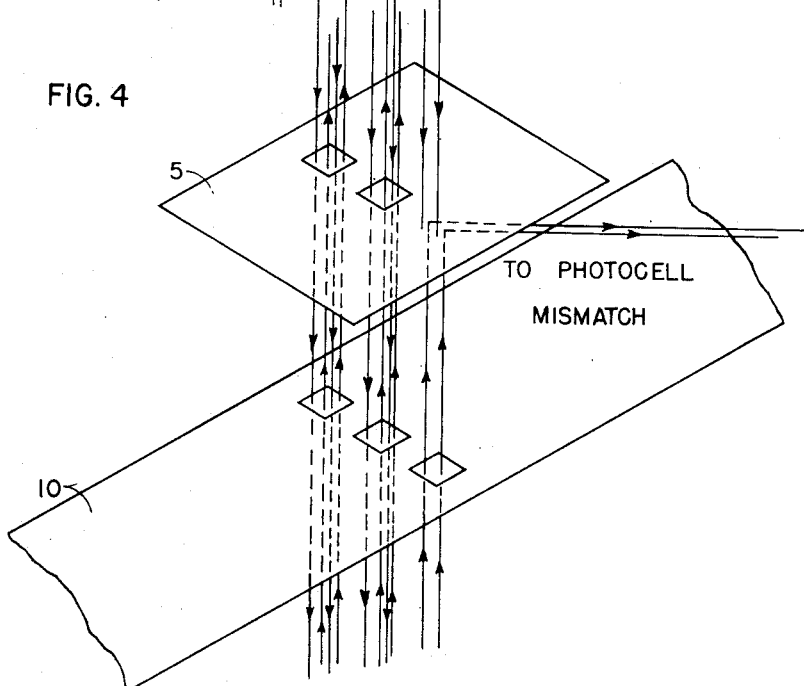

In Figure 4, the converse of the situation shown in Figure 3 is illustrated. In this figure the card carries one perforation which is not carried by the mask. Therefore all of the light passing through the perforations in the mask will pass through corresponding perforations in the card. However, since the card has one extra perforation, the light passing through this extra hole will find no corresponding perforation in the mask and therefore will be reflected from the under side of the mask. Again the photocell will detect light and the system will remain unactuated.

Figure 5:
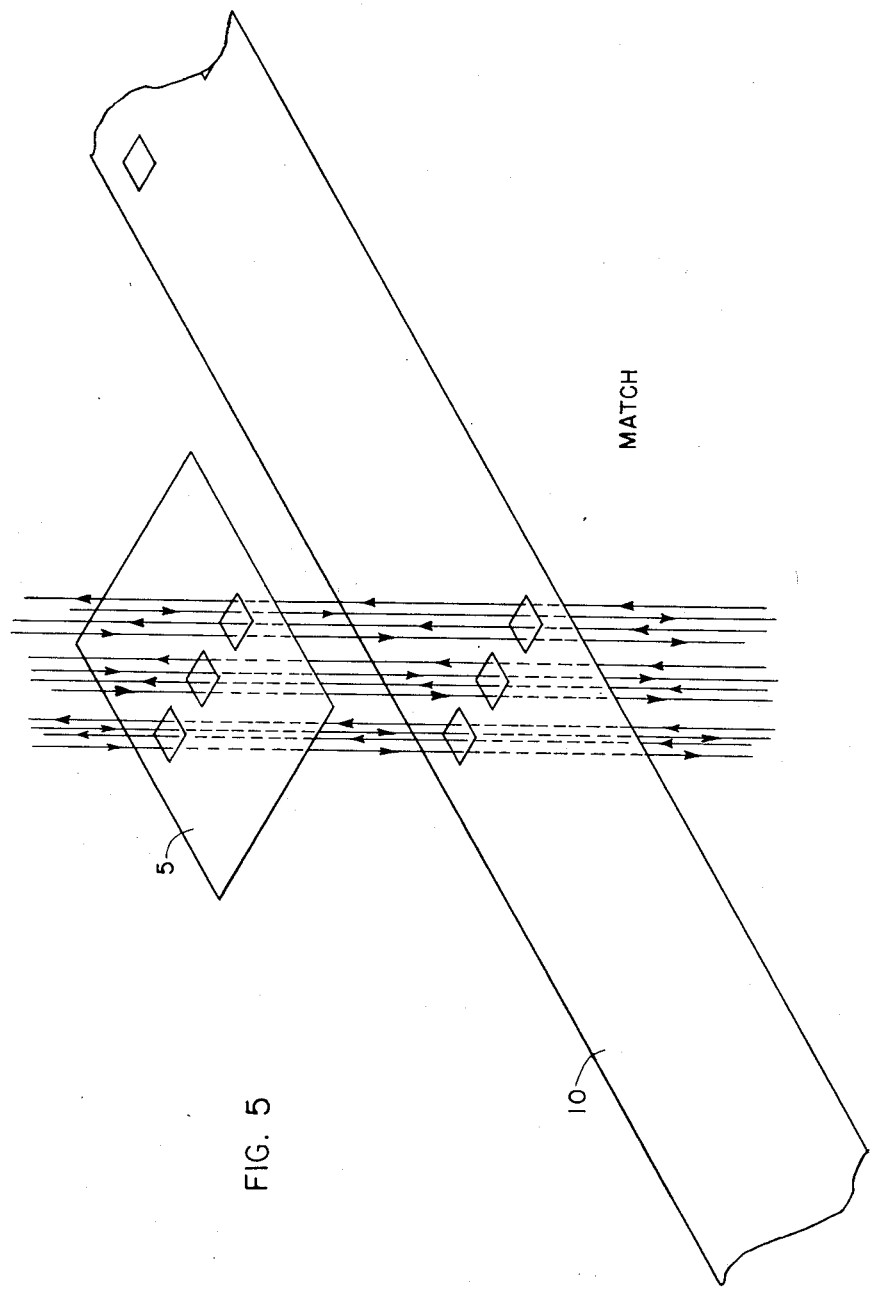

In Figure 5 there is shown a condition in which a perfect match is obtained. In this case all of the light passing through perforations in the mask will find corresponding perforations in the card and no light will be reflected from the card, and conversely light passing through the perforations in the card will find corresponding perforations in the mask and no light will be reflected from the under side of the mask. As a result no light will reach the photocell. The relay will be actuated, and the camera will take a picture of the information located at A on the card.

As previously stated, to obtain perfect functioning of the device the mirrors must be smaller than the holes through which the light passes. If the beams of light are as large or larger than the holes in the cards or mask, the light passing through the card or mask, respectively, would be diffused, thus spreading out the beam. When the beam reached the mask or card, respectively, it would be larger than the hole through which it has to pass. As a result some of the light would be deflected from around the top of the hole into the photocell, and the system would indicate a mismatch where there actually was a match.

It can be seen from the above that by the use of two sets of beams of light there can never be an indication of a match where there actually is none. The system demonstrated shows only four digit locations. However, the number of digit locations may be of any desired value depending upon the amount of information being stored. In a system using only 10 digit locations in a single column, 1023 separate code locations would be available.

It will be apparent that the embodiments shown are only exemplary and that various modifications can be made in construction and arrangement within the scope of my invention as defined in the appended claims.

I claim:

1. Apparatus for locating information comprising a mask and at least one record element each having predetermined code designations, two light sources, means for directing a portion of the light from one of said sources onto said record element, said portion being determined by the code designations of said mask, means for directing a portion of the light from the other of said sources onto said mask, said portion being determined by the code designations of said record element and means for detecting optical coincidence of said light portions.

2. Apparatus for locating information comprising a mask and at least one record element each having predetermined code designations, first and second light sources, means for directing a portion of the light from said first source onto said record element, said first source portion being determined by the configuration of the code designations of said mask, means for directing a portion of the light from said second source onto said mask, said second source portion being determined by the configuration of the code designations of said record element, and means for detecting optical coincidence of said light portions.

3. Apparatus for locating information comprising a mask and at least one record element each having predetermined light passing digit locations, first and second light sources, means for directing a portion of the light from said first source through said mask and onto said record element, means for directing a portion of the light from said second source through said record element and onto said mask and means sensitive to the reflected light between said mask and said record element for detecting optical coincidence of said light portions.

4. Apparatus for locating information comprising a mask and at least one record element each having predetermined light passing digit locations, first and second light sources, means for perpendicularly directing a portion of the light from said first source through said mask and onto said record element, means for perpendicularly directing a portion of the light from said second source through said record element and onto said mask, and means sensitive to the reflected light between said mask and said record element for detecting optical coincidence of said light portions.

5. Apparatus for locating information comprising a mask and at least one record element each having a predetermined number and spacing of light passing digit locations, first and second light sources, means for perpendicularly directing a portion of the light from said first source through said mask and onto said record element, means for perpendicularly directing a portion of the light from said second source through said record element and onto said mask, and means sensitive to the reflected light between said mask and said record element for detecting optical coincidence of said light portions.

6. Apparatus for locating information comprising a mask and a record element each having a predetermined number and spacing of light passing digit locations, first and second light sources adjacent said mask and said record element respectively, means for modifying the light from said first source to provide a beam of light for each digit location on said mask, means for modifying the light from said second source to provide a beam of light for each digit location on said record element, means for directing at least one of said beams from said first source through said mask and onto said record element, means for directing at least one of said beams from said second source through said record element and onto said mask, and means for detecting optical coincidence of said beams in the space between said mask and said record element.

7. Apparatus for locating information comprising a mask and a record element each having a predetermined number and spacing of light passing digit locations, means for positioning said mask and said record element in digit location alignment, first and second light sources adjacent said mask and said record element respectively, means for modifying the light from said first source to provide a beam of light for each digit location on said mask, means for modifying the light from said second source to provide a beam of light for each digit location on said record element, means for directing at least one of said beams from said first source through said mask and onto said record element, means for directing at least one of said beams from said second source through said record element and onto said mask, and means for detecting optical coincidence of said beams in the space between said mask and said record element.

8. The invention according to claim 7 in which said detecting means is a photosensitive element which is sensitive to the reflected light in said space.

9. The invention according to claim 7 in which said digit locations appear as perforations in the record element.

10. The invention according to claim 9 in which said beams of light are smaller than the corresponding digit locations.

11. The invention according to claim 7 in which the adjacent surfaces of said mask and said record element are covered with a highly reflective coating.

References Cited in the file of this patent

UNITED STATES PATENTS

| | | |
|---|---|---|
| 1,962,467 | Sholkin | June 12, 1934 |
| 2,026,330 | Tauschek | Dec. 31, 1935 |
| 2,131,911 | Ayres | Oct. 4, 1938 |
| 2,438,588 | Tolson | Mar. 30, 1948 |
| 2,448,830 | Robbins et al. | Sept. 7, 1948 |